Feb. 23, 1926.
B. R. WEBSTER
ELECTRICAL CONDENSER
Filed April 28, 1924
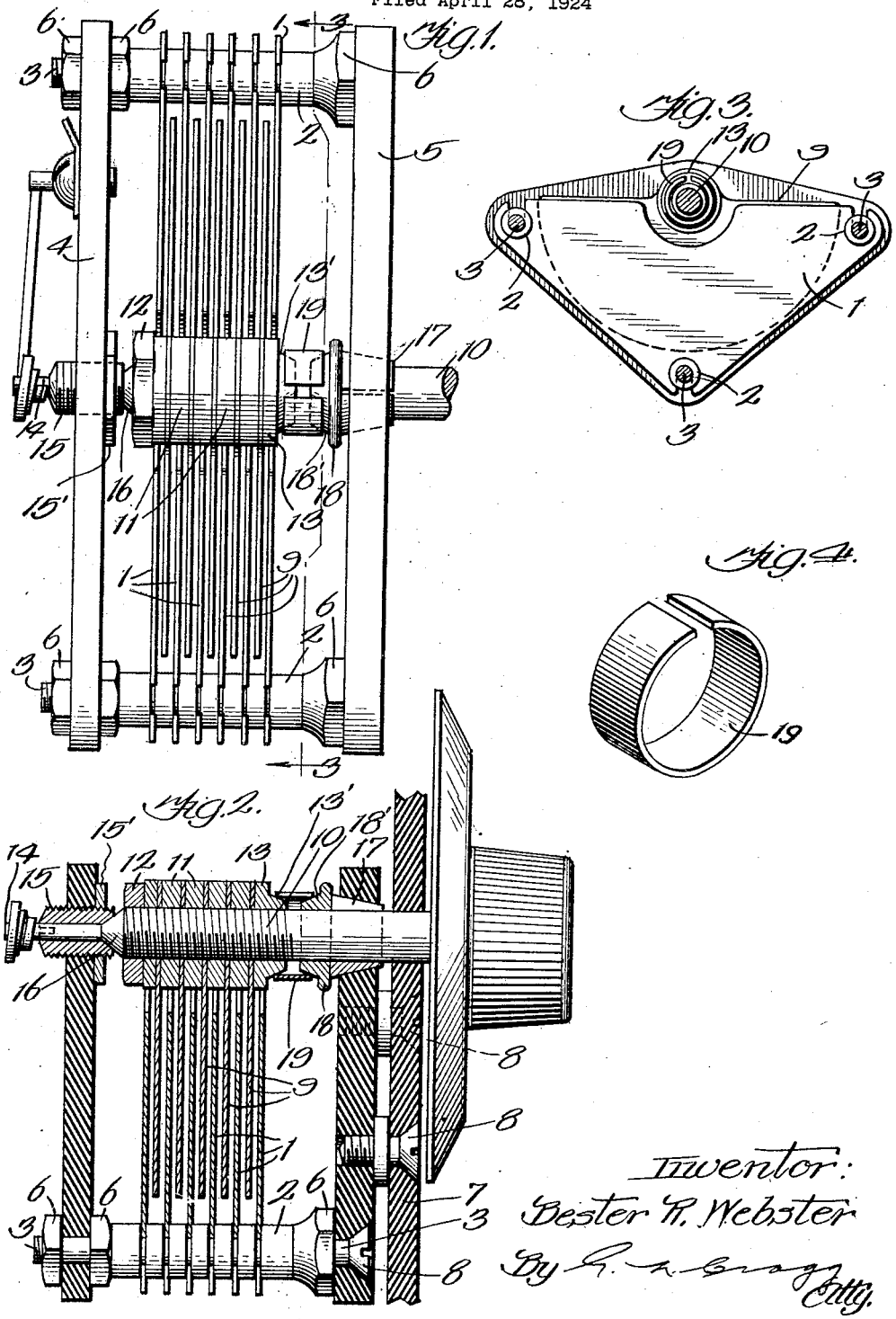

Patented Feb. 23, 1926.

1,574,268

UNITED STATES PATENT OFFICE.

BESTER R. WEBSTER, OF CHICAGO, ILLINOIS, ASSIGNOR TO RELIANCE DIE & STAMPING COMPANY, OF CHICAGO, ILLINOIS, A CORPORATION OF ILLINOIS.

ELECTRICAL CONDENSER.

Application filed April 28, 1924. Serial No. 709,514.

*To all whom it may concern:*

Be it known that I, BESTER R. WEBSTER, a citizen of the United States, residing at Chicago, in the county of Cook and the State of Illinois, have invented a certain new and useful Improvement in Electrical Condensers, of which the following is a full, clear, concise, and exact description.

My invention relates to adjustable electric condensers and employs a shaft carrying one of the condenser sides, bearings for the shaft, and means for adjusting the location of this condenser side along the shaft axis. By means of a condenser thus constructed the plane of rotation of the adjustable condenser side may be accurately defined to avoid short circuiting and disturbance of calibration.

In the preferred embodiment of the invention automatic means, such as a spring, serves to maintain the adjustment effected.

The invention will be more fully explained in connection with the accompanying drawing in which—

Fig. 1 is a view, in side elevation, showing the preferred embodiment of the invention;

Fig. 2 is an axial sectional view;

Fig. 3 is a view on line 3—3 of Fig. 1; and

Fig. 4 is a perspective view of the adjustment maintaining spring.

The stator of the condenser illustrated includes a group of plates 1 assembled with the sleeves 2 by being received in slots therein. Posts 3 pass through these sleeves and are assembled with the insulating mounting plates 4, 5 by means of nuts 6. The mounting plate 5 is fastened upon the rear side of the panel board 7 by means of the screws 8.

The rotor side of the condenser includes a group of plates 9 that are slipped upon the shaft 10. These plates 9 are spaced apart by the unthreaded washers 11 that are slipped upon the shaft. Nuts or abutments 12 and 13 clamp the plates 9 and their spacing washers together and therebetween.

The shaft 10 has a reduced end 14 received in the bearing 15, carried by the mounting plate 4 into which it is screwed, and a conical portion 16 received in a conical enlargement of the inner end of bearing 15 that also thus constitutes an end thrust bearing for the shaft. The other end of the shaft turns in a split sleeve bearing 17, carried by the mounting plate 5.

An unthreaded washer 18 surrounds the shaft and is interposed between the abutment nut 13 and the bearing 17. A spring 19, preferably in the form of a split ring, presses against the washer 18 as an abutment and upon the abutment nut 13 toward the abutment nut 12 to maintain the shaft in full engagement with its end thrust bearing. The plane of rotation of the shaft and the planes of the condenser plates upon the shaft are determined by turning the end thrust bearing, the spring 19 always maintaining the shaft in full engagement with the end thrust bearing. After the bearing 15 has been adjusted it is held by the nut 15'.

In the preferred embodiment of the invention, the opposed faces of the abutment nut 13 and washer 18 have conical formations 13', 18' that taper toward each other. The spring ring 19 will expand or contract to accommodate itself to changed positions of the nut 13 with respect to washer 18 following the adjustment of the rotor along the shaft axis, while at the same time continuing to press the shaft and the condenser side thereon fully toward the thrust bearing.

By means of my invention the condenser leaves 9 may be accurately adjusted with respect to the condenser leaves 1 to avoid short circuiting and disturbance of the calibration.

Changes may be made without departing from my invention.

Having thus described my invention, I claim:—

An electrical condenser including the two sides thereof, one side being a stator and the other side a rotor; a shaft carrying the condenser rotor; an end thrust bearing adjustable along the shaft axis; two abutments, one connected with the shaft and the other spaced apart from the first; and a spring in the form of a split ring bearing against said abutments and pressing the shaft upon its end thrust bearing, said abutments having conical formations tapering toward each other that are engaged by said ring.

In witness whereof, I hereunto subscribe my name.

BESTER R. WEBSTER.